March 19, 1929.    S. A. STAEGE    1,705,688
REGULATOR SYSTEM
Filed July 13, 1925
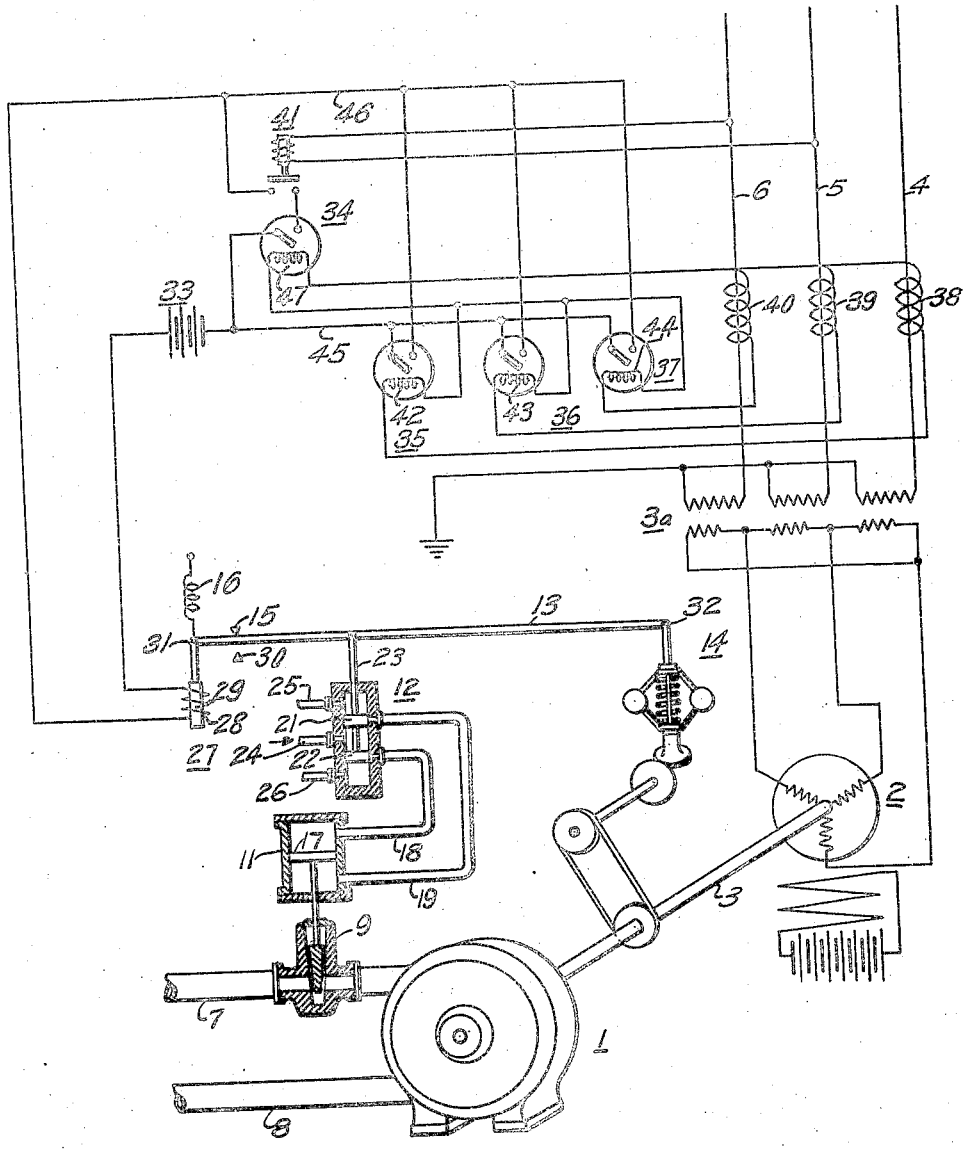
INVENTOR
Stephen A. Staege.
BY
Chesley L. Carr
ATTORNEY Patented Mar. 19, 1929.

1,705,688

UNITED STATES PATENT OFFICE.

STEPHEN A. STAEGE, OF PITTSBURGH, PENNSYLVANIA, ASSIGNOR TO WESTINGHOUSE ELECTRIC & MANUFACTURING COMPANY, A CORPORATION OF PENNSYLVANIA.

REGULATOR SYSTEM.

Application filed July 13, 1925. Serial No. 43,206.

My invention relates to regulator systems and more particularly to regulator systems for governing the operation of prime movers for generators.

An object of my invention is to modify the governor control of motive fluid to the prime mover of a generator to improve the stability of power transmission systems during transient or abnormal power-circuit conditions that give rise to "generator overswing" and to prevent one generating station from pulling out of synchronism with other stations of the system.

When the power demand on a generator increases or decreases suddenly by reason of load changes, switching, short-circuits or other transitory causes, there exists a momentary unbalance between the generator power input and the generator power output. This unbalanced condition is created because electrical changes in the transmission system occur much faster than mechanical changes in machines connected thereto and because changed load conditions require that the phase angle between the generator and the motor internal voltages vary in order to produce a balanced power condition. For the purpose of this discussion the various motors connected to the system may be considered as a single equivalent motor.

In super-power systems where different electric plants are connected together by interconnecting transmission lines, and where each of these plants has distribution circuits or loads adjacent thereto, there exists, with the present type of governors, the danger that during short-circuit conditions, the speed of the prime movers for the generators will vary to such an extent, while the synchronizing forces are insufficient to hold the several stations together, that when the drop in voltage that accompanies a short-circuit occurs the stations will pull out of synchronism, thus requiring the generators to be again synchronized at very great inconvenience.

One electrical characteristic of a power transmission system is that the power output of the generator is a sine function of the phase displacement between the generator and motor internal voltages. During the normal operation of the system at a particular phase angle between the generator and the motor internal voltages corresponds to equal power output and input to the generator; that is, to a state of stable equilibrium. Should the phase angle increase for some reason, with the generator power input remaining the same, the power output from the generator would become greater than the input, thereby causing the generator to slow down. Similarly, if the phase angle between the generator and the motor internal voltages is reduced, the generator power input becomes greater than the output, thereby causing the generator to speed up.

When a short-circuit occurs on a transmission line, the electrical characteristics of the line are so changed that the generator power output is increased for the existing phase angle between the motor and the generator internal voltages, thereby causing the generator to slow down. The slowing down of the generator causes the phase angle between the motor and generator to decrease, thereby decreasing the generator output and tending to bring the system into equilibrium again. When a phase relation is reached that gives the desired power balance, however, the rotor of the generator has a velocity differing from that of the other machines of the system and must, therefore, travel beyond the point of equilibrium. This phenomena is termed "generator overswing."

It will, therefore, be apparent that when a short-circuit occurs on the line, there is a momentary increase of considerable magnitude, in the load upon the generator during which period the generator tends to slow down in speed and fall back in angular displacement to a certain degree, thereby causing a material reduction in generator load. At the same time there is also a drop in voltage caused by the short-circuit, and this drop in voltage further tends to decrease the generator load. This decrease in generator load causes the prime mover to increase its speed and to advance the angular displacement between the generator and the remainder of the system to such degree that the synchronizing forces at the low voltage are inadequate to hold the two systems together, and the one station may pull out of synchronism with the remainder of the system.

The purpose of the present invention is to cause a decrease in the flow of motive fluid to the prime mover upon the occurrence of a short-circuit or other abnormal line condition, before the generator has had time to increase its speed, thereby reducing the forces that tend to pull the station out of synchronism with the remainder of the system.

My invention will be better understood by reference to the accompanying drawing, in which the single figure is a diagrammatic view of the apparatus and circuits employed in one modification of the invention.

Referring to the drawing, a prime mover, such as a water-wheel 1, is connected to a generator 2 by means of a shaft 3, the generator being connected through suitable transformers 3ª to supply energy to a power circuit 4, 5, 6. The prime mover is supplied with motive fluid by means of a conduit 7 and the used fluid is permitted to flow from the prime mover by the conduit 8. The flow of motive fluid to the prime mover is controlled by means of a valve 9 that is operated by a pressure cylinder 11 in accordance with the movement of a pilot valve 12 that is connected to a lever 13. One end of the lever 13 is attached at a point 32 to a fly-ball or other governor mechanism 14 about an upper abutment or pivot point 15, the lever 13 being normally maintained against the abutment 15 by means of a spring member 16. A lower abutment 30 is located opposite the abutment 15, for a purpose to be set forth.

The valve member 9 is connected to a piston 17 that slides within the pressure cylinder 11, which is supplied with fluid through pipes 18 and 19 in accordance with the operation of the pilot valve pistons 21 and 22, these pistons being connected by means of rod 23 to the lever 13, at a point intermediate pivot point 15 and governor 14. Three conduits 24, 25 and 26 are provided for permitting the pressure fluid to pass through the pilot valve, fluid passing into the pilot valve through the conduit 24 and thence into either of the pipes 18 or 19, or from these pipes through the conduits 25 and 26.

An electromagnet 27, having a winding 28 and a core member 29 that is attached to one end of the lever 13 at the point 31, is adapted, when energized, to pull that end of the lever 13 downwardly against the abutment 30 in opposition to the tension of the spring member 16, thus causing the lever 13 to pivot about the point 32 and actuate the pilot valve 12 downwardly. This action permits fluid pressure to enter from the conduit 24 and pass through the pipe 18 to the upper side of the pressure cylinder 11, thereby causing the valve 9 to be moved downwardly to reduce the input of motive fluid to the prime mover 1.

Electromagnet 27 may be energized from any suitable source of direct current, such as a battery 33, in accordance with the operation of any one of the several time-element current relays 35, 36 and 37, or upon the closing of both of the current relay 34 and line voltage relay 41. The relays 34, 35, 36 and 37 are set to close upon a predetermined current flow, and to open at a predetermined time after closing. Current transformers 38, 39 and 40 are connected to the three conductors 4, 5 and 6 of the power circuit, and are respectively connected through the operating coils 42, 43 and 44 of the relays 35, 36 and 37.

The circuits of the several current transformers are connected together and the common circuit extends through the operating coil 47 of the relay 34. The relay 34 is therefore, sensitive to an unbalanced or "ground" current in the supply circuit 4, 5, 6 and the relays 35, 36 and 37 are respectively sensitive to overload currents in the supply-circuit conductors 4, 5 and 6. The closing of any one of the individual current relays, 35, 36 or 37 or of relays 34 and 41 concurrently, causes a current to flow from the battery 33 through conductors 45 and 46 to the electromagnet 27, thereby operating the pilot valve 12 to reduce the flow of fluid to the prime mover 1.

In some cases, it is desirable for the ground relay 34 to actuate the magnet 27 only upon a predetermined drop in voltage of the supply circuit 4, 5 and 6. In such cases, a low voltage relay 41 is connected to have its contact members connected in series relation with the contact members of the relay 34. It is then necessary that a predetermined degree of unbalance, and a predetermined voltage drop occur before the electromagnet 27 will be energized through the relays 34 and 41.

When a short-circuit occurs on the transmission line there will be abnormal current flowing in one or more of the conductors 4, 5 and 6, and in the case of a short-circuit between a conductor and ground, unbalanced condition in the power circuit, thus causing current to flow through the operating winding of the current relay 34, or through one or more of the current relays 35, 36 and 37. The operation of these relays to close the relay contact members and energize the electromagnet 27, will cause the end 31 of the floating lever 13 to be pulled downwardly, thereby operating the valve mechanism 12, as previously explained.

The end 31 of the floating lever will be retained in its downward position for a predetermined time period, during which the valve 9 will be closing, so that at the time that the generator system would otherwise tend to increase its speed above synchronism, the power supplied to the prime mover 1 will be reduced to such value that the generator will not speed up sufficiently to cause it to pull out of synchronism with the system.

At the proper predetermined time, as many of the time relays 34, 35, 36 or 37 as were closed will open, causing the solenoid of the magnet 27 to be deenergized and permitting the spring 16 to again pull the end of the lever 13 into its upper position, thereby moving the pilot valve 12 in the opposite direction, so that no further movement of the main valve 9 will take place because of this initial impulse. From this time on, the movement of the prime mover control valve 9 will be regulated by the governor mechanism 14 to maintain constant speed.

The valve 9 will, therefore, be actuated upon the occurrence of a short-circuit on the transmission line, and in anticipation of the drop in generator power output, and will be much earlier than the action of the governor, inasmuch as it is necessary for the change in generator power output and the consequent change in speed, to occur before the governor can act. The governor, therefore, will not act quickly enough to avoid the necessity of a large equalizing current flowing to or from the generator.

By the use of this system, the prime-mover control valve 9 will be actuated toward its closed position at a time sufficiently early to prevent overspeeding and pulling out of synchronism of the generator with respect to the remainder of the system. The actual movement of the valve or gate is so small during the initial overloading of the generator that the actual drop in speed caused thereby is negligible but, by the time the above-noted increase in speed tends to take place, the main control valve will have been closed sufficiently to effectively prevent excessive overspeeding.

While the illustrated preferred form of the invention discloses a system for changing the valve setting temporarily upon the flow of abnormal currents in the power circuit, such as accompany a short-circuit of the power line, it is obvious that the electromagnet 27 may be actuated upon the occurrence of abnormal voltage conditions of the power circuit.

Many other modifications in the apparatus and circuits disclosed may be made within the spirit of my invention, and I do not wish to be limited other than by the scope of the appended claims.

I claim as my invention:

1. In a power-transmission system, a power circuit, a dynamo-electric machine connected to said power circuit, a prime mover for driving said machine, and means operative upon an abnormal rise in power-circuit current to reduce the flow of motive fluid to said prime mover to thereby increase the synchronizing force between the dynamo-electric machine and the power circuit.

2. In a power-transmission system, a power circuit, a generator connected to said power circuit, a prime mover for driving said generator, and means for increasing the stability of said transmission system comprising means operative upon abnormal power-circuit current for reducing the flow of motive fluid to said prime mover.

3. In a power-transmission system, a power circuit, a generator connected to said circuit, a prime-mover for driving said generator, and means for increasing the stability of said transmission system comprising means operative upon transient power-circuit current conditions for reducing the flow of motive fluid to said prime mover.

4. In a power-transmission system, a power circuit, a generator connected to said power circuit, a prime mover for driving said generator, and means operative upon an unbalanced power-circuit current condition for decreasing the flow of motive fluid to said prime mover to increase the stability of said power-transmission system.

5. In a power-transmission system, a power circuit, a generator connected to said circuit, a prime mover for driving said generator, means for governing the flow of motive fluid to said prime mover comprising a pilot valve, and means operative upon the occurrence of a short-circuit upon said power circuit for actuating said pilot valve to cause a decrease in the flow of motive fluid to said prime mover to decrease the generator overswing and increase the stability of the system.

6. In a power-transmission system, a power circuit, a generator connected to said power circuit, a prime mover for driving said generator, and means for increasing the stability of said transmission system comprising electro-responsive means for decreasing the flow of motive fluid to said prime mover and a plurality of relays operative upon abnormal power-circuit current conditions to energize said electro-responsive means for a predetermined time.

7. In a power-transmission system, a power circuit, a dynamo-electric machine connected to said power circuit, a prime mover for driving said machine, a speed regulator for governing said prime mover, and means, comprising a relay actuated upon the flow of a predetermined value of ground current in said power circuit, for initiating a corrective regulating action in advance of the normal control by said speed regulator to reduce generator overswing and thereby increase the stability of the transmission system.

8. In a power-transmission system, a power circuit, a dynamo-electric machine connected to said power circuit, a prime mover for driving said machine, a speed regulator for regulating said prime mover, and means for increasing the stability of said transmission system comprising a relay actuated upon abnormal power circuit current conditions to initiate a corrective movement in advance of the normal action of said speed regulator.

In testimony whereof, I have hereunto subscribed my name this 8th day of July, 1925.

STEPHEN A. STAEGE.